United States Patent
Li et al.

(10) Patent No.: US 10,935,443 B2
(45) Date of Patent: Mar. 2, 2021

(54) PRESSURE SENSING DEVICE AND PRESSURE SENSING APPARATUS

(71) Applicant: SHENZHEN NEW DEGREE TECHNOLOGY CO., LTD., Guangdong (CN)

(72) Inventors: Hao Li, Guangdong (CN); Weizhi Liu, Guangdong (CN); Yabo Guo, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/609,014

(22) PCT Filed: Jul. 19, 2017

(86) PCT No.: PCT/CN2017/093495
§ 371 (c)(1),
(2) Date: Oct. 28, 2019

(87) PCT Pub. No.: WO2019/014866
PCT Pub. Date: Jan. 24, 2019

(65) Prior Publication Data
US 2020/0141817 A1    May 7, 2020

(51) Int. Cl.
*G01L 1/00*    (2006.01)
*G01L 1/14*    (2006.01)
(Continued)

(52) U.S. Cl.
CPC .............. *G01L 1/142* (2013.01); *G01L 1/16* (2013.01); *G01L 1/2262* (2013.01)

(58) Field of Classification Search
CPC .......... G01L 1/142; G01L 1/16; G01L 1/2262
(Continued)

(56) References Cited

U.S. PATENT DOCUMENTS 3,978,731 A * 9/1976 Reeder .................. G01L 9/0025
73/703
5,412,992 A * 5/1995 Tobita ..................... G01L 9/065
338/4
(Continued)

FOREIGN PATENT DOCUMENTS

| CN | 105806519 | 7/2016 |
| CN | 105843425 | 8/2016 |
| CN | 206193606 | 5/2017 |

OTHER PUBLICATIONS

International Search Report for PCT/CN2017/093495 dated Apr. 17, 2018, 6 pages.
(Continued)

*Primary Examiner* — Max H Noori
(74) *Attorney, Agent, or Firm* — Nixon & Vanderhye PC

(57) ABSTRACT

Provided is a pressure sensing device, which includes one or more pressure sensing sheet and a first substrate for supporting the pressure sensing sheet. The pressure sensing sheet is connected with the first substrate through welding, a welding spot of the welding is configured for deformation transfer and electrical signal transmission. The pressure sensing sheet includes a second substrate, at least one pressure sensing component, and a plurality of pads. The pressure sensing component is arranged at a lower surface and/or an upper surface of the substrate, the pads are arranged at the upper surface of the second substrate and are conductively connected with the pressure sensing component for deformation transfer and electrical signal transmission. The deformation is transferred to the substrate of the pressure sensing sheet through the pads when the pressure sensing device deforms.

15 Claims, 4 Drawing Sheets

(51) Int. Cl.
 *G01L 1/16* (2006.01)
 *G01L 1/22* (2006.01)
(58) Field of Classification Search
 USPC .................................................. 73/862.626
 See application file for complete search history.

(56) References Cited

U.S. PATENT DOCUMENTS

| | | | |
|---|---|---|---|
| 6,393,919 B1* | 5/2002 | Ohji | G01L 11/002 |
| | | | 73/708 |
| 10,296,123 B2* | 5/2019 | Agarwal | G06F 3/0414 |
| 2009/0177096 A1* | 7/2009 | Kim | G01L 9/0016 |
| | | | 600/488 |
| 2014/0102221 A1* | 4/2014 | Rebhan | G01L 5/008 |
| | | | 73/862.381 |
| 2015/0261371 A1 | 9/2015 | Li | |
| 2016/0223444 A1* | 8/2016 | Pagani | G01N 3/08 |

OTHER PUBLICATIONS

Written Opinion of the ISA for PCT/CN2017/093495 dated Apr. 17, 2018, 4 pages.

* cited by examiner

PRESSURE SENSING DEVICE AND PRESSURE SENSING APPARATUS

CROSS REFERENCE TO RELATED APPLICATIONS

This application is a National Stage of PCT Application No. PCT/CN2017/093495 filed on Jul. 19, 2017, the content of which is incorporated herein in its entity by reference.

TECHNICAL FIELD

The present application pertains to the field of sensors, and more particularly to a pressure sensing sheet, a pressure sensor and a pressure sensing device.

BACKGROUND

Strain-type force-sensitive sensors are formed by attaching strain gauges to a sensor elastomer, such as a weighing sensor, an acceleration sensor and a pressure sensor etc., and the performance of the strain gauges directly determines the performance of this type of sensors.

Current schemes for a pressure resistor button, such as a bridge support structure, have problems that it needs to be customized according to the structure, foam and a structure are necessary to support a fingerprint pressure button, its versatility is not strong, and it highly depends on a panel structure and the like.

Technical Problem

An objective of the present application is to provide a pressure sensing sheet, so as to solve the problems existed in the prior art that the schemes for a pressure resistor button need a customized structure and its versatility is not strong.

SUMMARY

In order to achieve the above objective, a technical solution adopted by the present application is as follows: a pressure sensing device, which includes one or more pressure sensing sheet and a first substrate for supporting the pressure sensing sheet. The pressure sensing sheet is connected with the first substrate by a way of welding, a welding spot of the welding is configured for deformation transfer and electrical signal transmission, and the pressure sensing sheet includes:

a second substrate, provided with an upper surface and a lower surface opposite to the upper surface;

at least one pressure sensing component, arranged at the lower surface and/or the upper surface of the second substrate; and a plurality of pads, configured for welding with the second substrate, among which the pads are arranged at the upper surface of the second substrate and are conductively connected with the pressure sensing component.

Moreover, a pressure sensing apparatus is provided, which is provided with a control panel and further includes the above-mentioned pressure sensing device. The pressure sensing device is adhered to an inner surface of the control panel and deforms with the control panel.

Moreover, a pressure sensing apparatus is provided, which is provided with a control panel and a control circuit board for controlling the panel adhered to an inner surface of the control panel, and further includes the above-mentioned pressure sensing device. The first substrate of the pressure sensing device is the control circuit board for controlling the panel, and the second substrate of the pressure sensing device deforms with the control circuit board for controlling the panel.

BENEFICIAL EFFECTS

Beneficial effects of the pressure sensing device/pressure sensing apparatus provided by the present application lie in that: compared with the prior art, the pressure sensing device/pressure sensing apparatus in the present application can be arranged on any apparatus via the substrate, and the deformation will be transferred to the pressure sensing sheet through the pads with no requirement for a customized structure and strong universality when the pressure sensing device/pressure sensing apparatus deforms.

DESCRIPTION OF THE DRAWINGS

In order to more clearly illustrate the technical solutions in the embodiments of the present application, the drawings used in the description of the embodiments or the prior art will be briefly described below. Obviously, the drawings in the following description are only some embodiments of the present application, and other drawings may be obtained according to theses drawings without inventive work for those of ordinary skill in the art.

EMBODIMENTS OF THE APPLICATION

In order to make the technical problems to be solved, the technical solutions and the beneficial effects of the present application more clear and comprehensible, the present application will be further described in detail below with reference to the accompanying drawings and embodiments. It should be understood that, the specific embodiments described herein are merely to illustrate the present application and are not intended to limit the present application.

It should be noted that, when an element is referred to as "being fixed to" or "being arranged to" another element, it can be directly or indirectly on said another element. When an element is referred to as "being connected to" another element, it can be directly or indirectly connected to said another element. In the description of the present application, the meaning of "a plurality of" means two or more unless clearly and specifically defined otherwise.

First Embodiment

Figure 1:
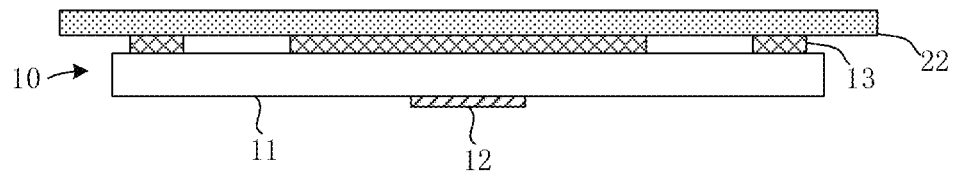
FIG. 1 is a schematic structural diagram of a pressure sensing device provided by a first embodiment of the present application.

Referring to FIG. 1, in a preferred embodiment, the pressure sensing device 20 includes one or more pressure sensing sheets 10 and a first substrate 22 configured to support the pressure sensing sheets 10. The pressure sensing sheet 10 is connected with the first substrate 22 by a way of welding, and the connection may be specifically by a way of a surface mount technology (SMT), and a welding spot of the welding is configured for deformation transfer and electrical signal transmission. The pressure sensing sheet 10 includes a second substrate 11, at least one pressure sensing component 12, and a plurality of pads 13 configured for welding with the second substrate 11. The second substrate 11 is provided with an upper surface, and a lower surface opposite to the upper surface. The pressure sensing component 12 is arranged on the lower surface and/or the upper surface of the second substrate 11. The plurality of pads 13 are arranged on the second substrate 11, and are conductively connected with the pressure sensing component 12.

Specifically, the pressure sensing device 12 is printed on one side or both sides of the second substrate 11 by a way of printing, the pressure sensing sheet 10 is welded to the first substrate 22 through a welding process, and the pressure sensing component 12 senses the curvature change and the electrical signal transmission through the pads 13.

Among them, the first substrate 22 is a flexible printed circuit (FPC), a printed circuit board (PCB), a metal substrate, or a ceramic substrate. The pressure sensing sheet 10 is of a resistive type, a capacitive type or an inductive type.

Figure 2:
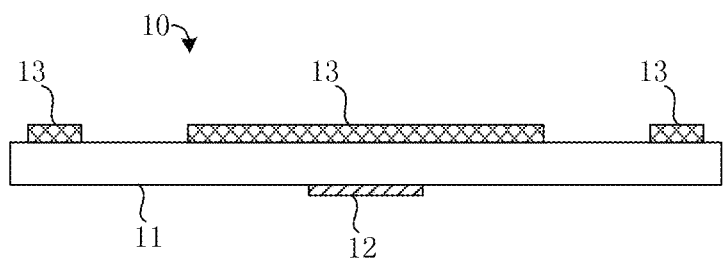
FIG. 2 is a schematic structural diagram of a first pressure sensing sheet in the pressure sensing device as shown in FIG. 1.
Figure 3:
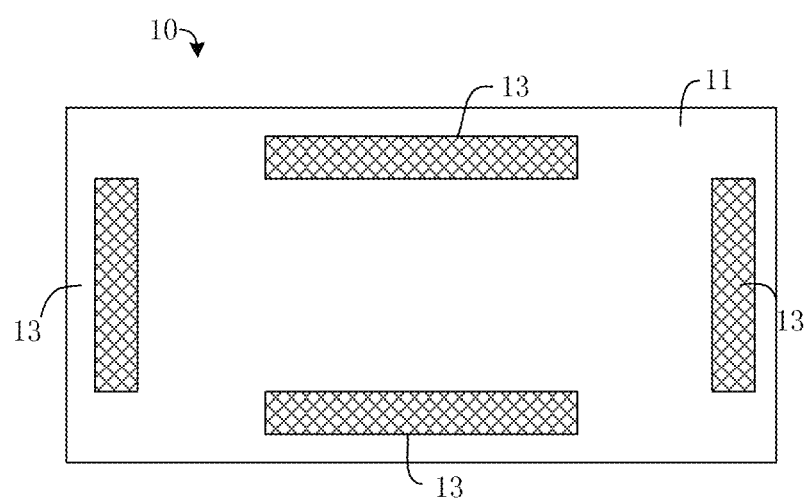
FIG. 3 is a top view of the pressure sensing sheet as shown in FIG. 2.

Referring to FIGS. 1 to 3, the pressure sensing component 12 is arranged at a middle position of the surface of the substrate 11, and the pads 13 is arranged around the pressure sensing component 12.

In one of the embodiments, the substrate 11 is a glass plate, a ceramic plate, a PCB board, an aluminum substrate or a silicon chip, and the pressure sensing component 12 is arranged on the substrate 11 by a way of sputtering, ion implantation or printing. The pressure sensing component 12 is a pressure sensing resistor, a pressure sensing capacitor or a pressure sensing inductor. Moreover, the pressure sensing component 12 may be a piezoelectric ceramic component.

Figure 4:
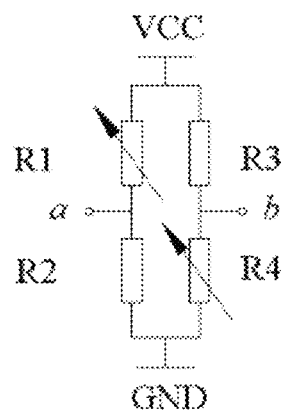
FIG. 4 is a circuit diagram of a Wheatstone bridge.

In one of the embodiments, referring to FIG. 2 and FIG. 3, a pressure sensing resistor is taken as an example. One pressure sensing sheet 10 is provided with one pressure sensing resistor thereon, which may be arranged on the upper surface or the lower surface of the substrate 11 (it is arranged on the lower surface in the exemplary figure), and there may provide two pads 13 as an input terminal and an output terminal of the pressure sensing resistor respectively, and of course, four pads 13 may be provided also. Thus, the pressure sensing sheet 10 is fabricated in a form of a single resistor, and four pressure sensing sheets 10 with the form of single resistor may be utilized as a whole when used, so that four of the pressure sensing resistors from a Wheatstone bridge (referring to FIG. 4). In addition, there may also provide two pressure sensing resistors, and the two pressure sensing resistors form a single bridge.

Figure 5:
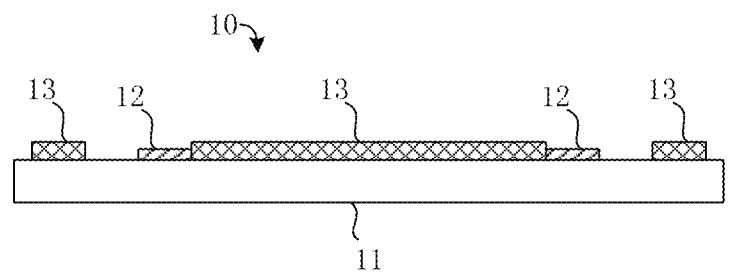
FIG. 5 is a schematic structural diagram of a second pressure sensing sheet provided by the first embodiment of the present application.
Figure 6:
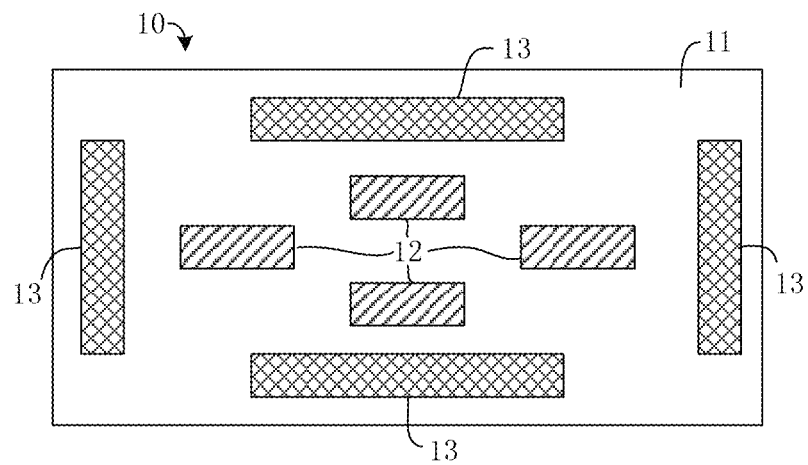
FIG. 6 is a top view of the pressure sensing sheet as shown in FIG. 5.
Figure 7:
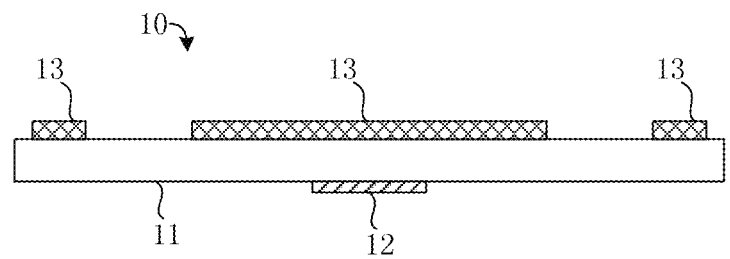
FIG. 7 is a schematic structural diagram of a third pressure sensing sheet provided by a third embodiment of the present application.
Figure 8:
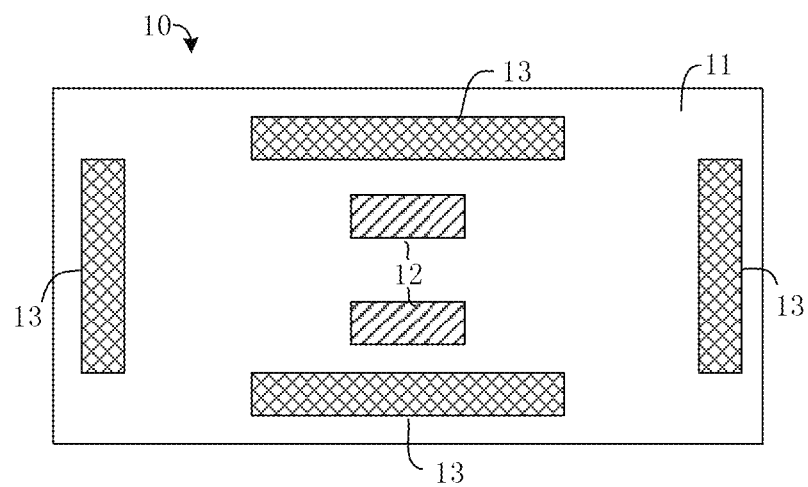
FIG. 8 is a top view of the pressure sensing sheet as shown in FIG. 7.

In another embodiment, referring to FIGS. 5-8, four pressure sensing resistors are arranged on one pressure sensing sheet 10, and the four pressure sensing resistors form a Wheatstone bridge. At this time, there may provide four pads 13 as an input terminal, output terminal, power terminal, and ground terminal of the Wheatstone bridge respectively (see FIG. 3). Referring to FIGS. 5 and 6, when the four pressure sensing resistors are arranged on the one pressure sensing sheet 10, the four pressure sensing resistors may all be arranged on the upper surface or the lower surface of the substrate 11. Moreover, referring to FIG. 7 and FIG. 8, it is also feasible that two of the four pressure sensing resistors are arranged on the upper surface of the substrate 11, and the other two arranged on the lower surface of the substrate 11.

The pressure sensing resistors are resistors having a piezoresistive effect, for example, the pressure sensing resistors are a piezoresistive strain resistor or a metal strain resistor.

Referring to FIG. 1, the pressure sensing sheet 10 may be arranged on any pressure sensing device 20 having the first substrate 11 through a pad 13 through the pads 13, and the first substrate 11 may be a support board or a circuit board of the device. When the first substrate 11 of the pressure sensing device 20 is deformed, the deformation is transmitted to the pressure sensing sheet 10 through the pads 13, and then electrical parameters of the pressure sensing component 12 of the pressure sensing sheet 10 will change, so that an output signal from the pressure sensing sheet 10 will change, which requires no customized structure and provides strong versatility.

Second Embodiment

Figure 9:
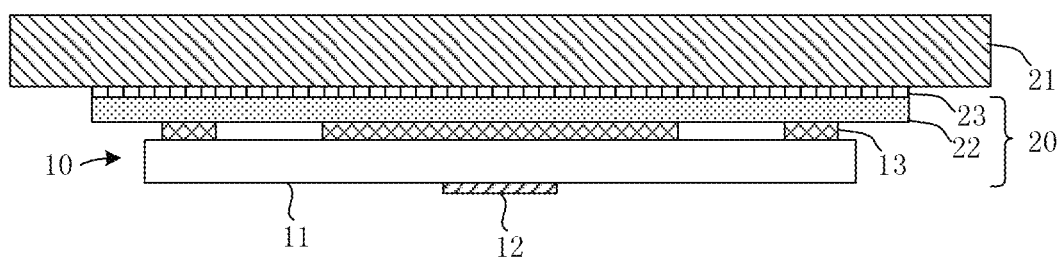
FIG. 9 is a schematic structural diagram of a pressure sensing apparatus provided by an embodiment of the present application.
Figure 10:
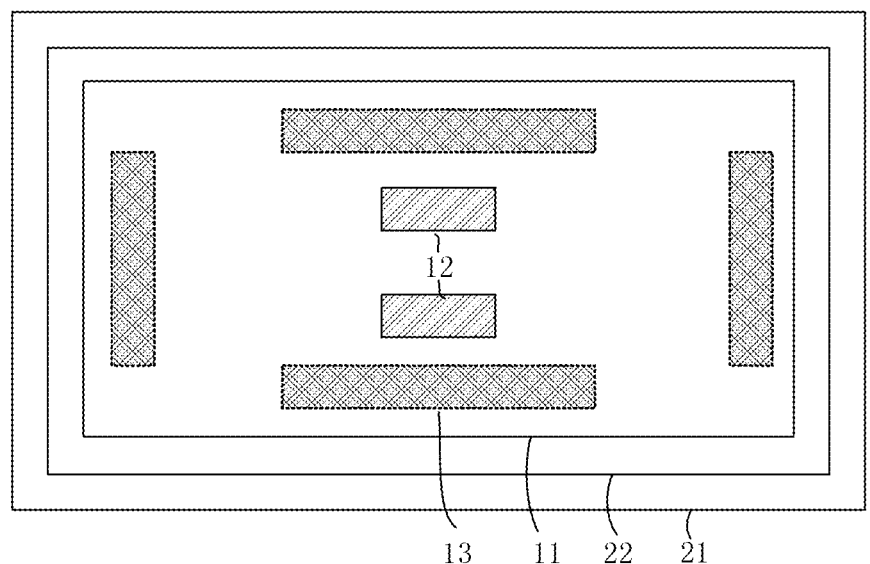
FIG. 10 is a top view of the pressure sensing device as shown in FIG. 9.

Further, referring to FIG. 9 and FIG. 10, a pressure sensing apparatus is further disclosed. The pressure sensing apparatus is provided with a control panel 21 and the above-mentioned pressure sensing device 20. The pressure sensing device 20 is attached to an inner surface of the control panel 21, and may deform with the control panel 21.

Third Embodiment

Further, referring to FIG. 9 and FIG. 10, another pressure sensing apparatus is further disclosed. The pressure sensing apparatus is provided with a control panel 21, a control circuit board for controlling the panel attached to an inner surface of the control panel 21, and the above-mentioned pressure sensing device 20. A first substrate 22 of the pressure sensing device 20 is the control circuit board for controlling the panel, and a second substrate 11 of the pressure sensing device 20 deform with the control circuit board for controlling the panel.

During a specific process of using the pressure sensing apparatus provided in the second embodiment and the third embodiment, the customer designs the control circuit board for controlling the panel (the first substrate) 22 according to the shape of the control panel 21, and then welds the pressure sensing sheet 10 to the control circuit board 22 for controlling the panel through the pads 13. The customer's control circuit board 22 for controlling the panel is then adhered to the control panel 21 by adhesive such as a double-sided tape 23 etc. Its principle is as follows: the control panel 21 deforms after suffering from external pressure, and the deformation is transmitted to the customer's control circuit board 22 for controlling the panel through the double-sided tape, and then transmitted to the substrate 11 of the pressure sensing sheet 10 through the pads 13, thereby resulting in changes of a resistance value, a capacitance value or an inductance value of the pressure sensing component 12 on the substrate 11, and change of voltage difference across the bridges a and b (referring to FIG. 3).

Figure 11:
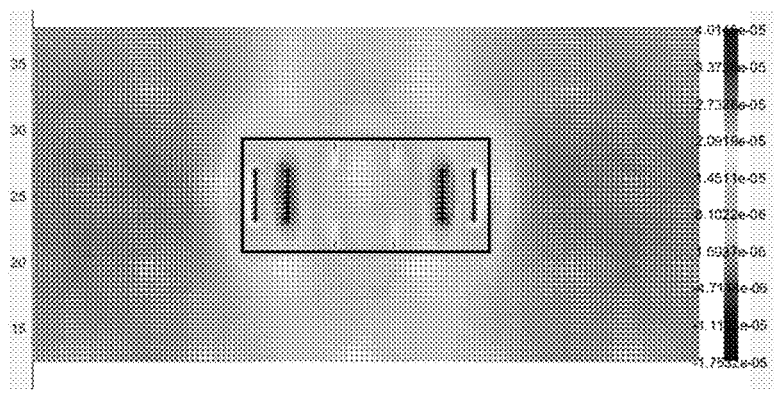
FIG. 11 shows curvature distribution of a first substrate in the pressure sensing device after being pressed.
Figure 12:
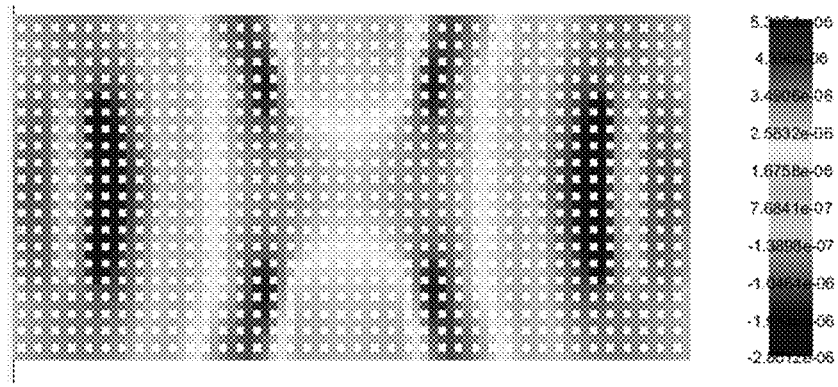
FIG. 12 shows curvature distribution of a second substrate of the pressure sensing sheet in the pressure sensing device after being pressed.

The soldering tin and the substrate of the sensor can enlarge the deformation of the control circuit board 22 for controlling the panel, that is, the curvature of the substrate 11 of the pressure sensing sheet 10 is greater than the curvature of the substrate of the control circuit board 22 for controlling the panel, thereby enabling to magnify the signal from the pressure sensing component 12 which is a double-sided arrangement solution. Referring to FIG. 10 and FIG. 11, it is found by finite element simulation that the curvature of the substrate 11 of the pressure sensing sheet 10 is 20% to 100% larger than the curvature of the substrate of the control circuit board 22 for controlling the panel.

Fourth Embodiment

Referring to FIG. 1, a monocrystalline silicon chip is used as the substrate 11 of the pressure sensing sheet 10, and resistors 12 with a piezoresistive effect are formed on the silicon chip by an impurity diffusion process. Similarly, the resistors 12 may be distributed on one surface or two surfaces of the substrate 11.

Then, a circuit is formed on the silicon substrate 11 by a metal plating process, and the resistors 12 are connected in series and in parallel to form a Wheatstone bridge.

Further, according to the method of the first embodiment, the pressure sensing sheet 10 is welded onto the control circuit board (first substrate) 22 through the welding spots 13.

Fifth Embodiment

Referring to FIG. 1, metal is sputtered onto the insulating substrate 11 to form resistors 12, and then the resistors 12 are connected in series and in parallel by a circuit (which may be formed by printing, plating, etching, etc.) to form a Wheatstone bridge, a single resistor or a half bridge. Further, according to the method of the first embodiment, the pressure sensing sheet 10 is welded onto the control circuit board (first substrate) 22 through the welding spots 13.

The above description only describes preferred embodiments of the present application, and is not intended to limit the present application. Any modification, equivalent substitution and improvement made within the spirit and principles of the present application should be included in the protection scope of the present application.

What is claimed is:

1. A pressure sensing device, comprising
a pressure sensing sheet, and
a first substrate for supporting the pressure sensing sheet,
wherein the pressure sensing sheet is connected with the first substrate by welding, and a welding spot of the welding is configured for deformation transfer and electrical signal transmission,
wherein the pressure sensing sheet comprises:
a second substrate comprising an upper surface and a lower surface opposite to the upper surface;
at least one pressure sensing component, arranged at the lower surface and/or the upper surface of the second substrate; and
a plurality of pads, configured for welding with the second substrate, wherein the pads are arranged at the upper surface of the second substrate and are conductively connected with the at least one pressure sensing component.

2. The pressure sensing device according to claim 1, wherein the first substrate is selected from a group consisting of an FPC, a PCB, a metal substrate and a ceramic substrate.

3. The pressure sensing device according to claim 1, wherein the pressure sensing sheet is of a resistive type, a capacitive type, an inductive type or a piezoelectric type.

4. The pressure sensing device according to claim 1, wherein the plurality of pads are arranged along a periphery of the upper surface of the second substrate.

5. The pressure sensing device according to claim 1, wherein the second substrate comprises a gas plate, a ceramic plate, a PCB board, an aluminum substrate or a silicon chip.

6. The pressure sensing device according to claim 1, wherein the at least one pressure sensing component is arranged on the second substrate by sputtering, ion implantation or printing.

7. The pressure sensing device according to claim 1, wherein the at least one pressure sensing component comprises a pressure sensing resistor, a pressure sensing capacitor or a pressure sensing inductor.

8. The pressure sensing device according to claim 1, wherein the at least one pressure sensing component comprises a piezoelectric ceramic component.

9. The pressure sensing device according to claim 7, wherein the at least one pressure sensing component comprises a pressure sensing resistor.

10. The pressure sensing device according to claim 7, wherein the at least one pressure sensing component comprises plural pressure sensing resistors forming a half bridge.

11. The pressure sensing device according to claim 7, wherein the at least one pressure sensing component comprises four pressure sensing resistor legs forming a Wheatstone bridge.

12. The pressure sensing device according to claim 11, wherein the four pressure sensing resistor legs are all arranged on the upper surface or the lower surface of the second substrate.

13. The pressure sensing device according to claim 11, wherein two of the four pressure sensing resistor legs are arranged at the upper surface of the second substrate, and the other two of the four sensing resistor legs are arranged at the lower surface of the second substrate.

14. A pressure sensing apparatus, provided with a control panel, wherein the pressure sensing apparatus further comprises the pressure sensing device according to claim 1, and the pressure sensing device is adhered to an inner surface of the control panel and deformable with the control panel.

15. A pressure sensing apparatus, comprising:
a control panel, and
the pressure sensing device according to claim 1, wherein:
the first substrate of the pressure sensing device comprises a control circuit board for controlling a panel adhered to an inner surface of the control panel, and
the second substrate of the pressure sensing device is deformable with the control circuit board for controlling the panel.

* * * * *